United States Patent [19]

Ferriter et al.

[11] Patent Number: 4,847,761

[45] Date of Patent: Jul. 11, 1989

[54] AUTOMATED BILL OF MATERIAL

[75] Inventors: Kate M. Ferriter, Atlanta; Robert B. Mathis, Marietta, both of Ga.

[73] Assignee: International Business Machines Corp., Armonk, N.Y.

[21] Appl. No.: 100,395

[22] Filed: Sep. 24, 1987

[51] Int. Cl.$^4$ ............................................. G06F 15/00
[52] U.S. Cl. ..................... 364/401; 364/403
[58] Field of Search ............... 364/401, 400, 200, 900, 364/403, 474.27, 474.26

[56] References Cited

U.S. PATENT DOCUMENTS

| | | | |
|---|---|---|---|
| 4,459,663 | 7/1984 | Dye | 364/300 |
| 4,623,964 | 11/1986 | Getz et al. | 364/401 |
| 4,646,238 | 2/1987 | Carlson, Jr. et al. | 364/468 |
| 4,731,725 | 3/1988 | Suto et al. | 364/415 |
| 4,733,354 | 3/1988 | Potter et al. | 364/415 |

Primary Examiner—Jerry Smith
Assistant Examiner—Kimthanh T. Bui
Attorney, Agent, or Firm—C. Lamont Whitham; Michael E. Whitham

[57] ABSTRACT

A bill of material for a product is automatically created from a query session on the product structure. The user is first queried on functional product structure. A top down approach, rather than a focus on design details, is encouraged. As the query occurs, a hierarchical tree structure is created on the screen for the user to view. Within a relational database, the structure data is kept in a table which is accessed by item number. Once the product structure is established, the user can see the hierarchical tree and check it for correctness. From the tree structure, which has been captured in the relational database, the indented bill of material is built.

7 Claims, 6 Drawing Sheets

```
1xxxxxxx
 2xxxxxxx
    6xxxxxxx
    7xxxxxxx
 3xxxxxxx
 4xxxxxxx
    8xxxxxxx
 5xxxxxxx
    9xxxxxxx
    10xxxxxxx
```

```
= 				A	M	S				↑ ↓
VIEW  DETAIL  BUILD  EXIT						F1 = HELP
```

LAWNMOWER BILL OF MATERIAL
USE ↑ OR ↓ TO SELECT ONE.

BILL OF MATERIAL

| LAWNMOWER |
-     HANDLE ASSEMBLY
-         UPPER HANDLE ASSEMBLY
-             HANDLE 18GA STEEL-CHROME PLATED
-             SLIDE STRAIN RELIEF
-             BOLTS (4)
-             WASHER (4)
-             LOCKING KNOBS (4)
-             SHOULDER BOLT (2)
-         LOWER HANDLE ASSEMBLY
-             LOWER HANDLE 16GA STEEL-CHROME PLATED
-             SHOULDER BOLTS (2)
-             NUTS (2)
-             HANDLE BRACKET WASHER

*FIG. 9*

AUTOMATED BILL OF MATERIAL

BACKGROUND OF THE INVENTION

1. Field of the Invention

The present invention generally relates to a computer based project management system and, more particularly, to a system which automatically creates of a bill of material from a query session using a relational database.

2. Description of the Prior Art

The process of designing, developing and manufacturing a new product, or making major changes to existing products, presents many challenges to product managers and engineers to bring the product to market for the least cost, within schedule while maintaining product quality. In today's highly competitive industries, product managers and engineers require information to address many problems that arise because of the complexity of new products and the complexity of worldwide production and the changing nature of competition. Because new products need to be brought to market in a very short time period to meet the competition, the traditional learning curve formerly associated with product development has disappeared, creating the need to better control product release and determine cost impacts of designs early in the design process.

To meet these needs, many companies are realizing that the conventional product design process is not satisfactory. They require early involvement of manufacturing engineering, cost engineering, logistics planning, procurement, manufacturing and service/support with the design effort. In addition, they require planning and control of product data through design, release and manufacturing.

Project Management, as a modern management tool, has its origins in the early part of this century when Henry L. Gantt, while working for the government during World War I, developed his now famous visual aid for work control. The Gantt chart is a graphic representation of a project schedule that shows each task as a bar having a length proportional to the duration of the task. Later during the 1950s, Dr. John Presper Mauchley, a co-inventor of the EDVAC at the University of Pennsylvania, developed the Critical Path Method (CPM) which was further developed by Willard Frazer, a consultant on the Polaris submarine project. Frazer's contribution was called Program Evaluation and Review Technique (PERT). A PERT chart is one that resembles a flow chart showing predecessor and successor tasks of a project and the critical path.

PERT/CPM models are known and have been used for many years by many large corporations for project management. Such project management tools were first implemented on main frame computers and then on mini computers, equipment which was readily available to large corporations but not to small corporations and firms. More recently, various project management software products have been developed for micro or so-called personal computers. An example of a project management tool which was originally written as a mainframe program and later rewritten as a personal computer program is *Plantrac*, published by Computerline, Inc. This program was originally written in England for the construction industry and later imported to the U.S.A. The first project management tool written specifically for the personal computer was called the *Harvard Project Manager*, now published by Software Publishing Corp. There are now over one hundred project manager applications written for personal computers. These have made computer based project management tools more economically accessible to small corporations and firms, but their application requires some degree of sophistication on the part of the user. As a result, many small corporations and firms still use manual methods of project management, often relying on an expediter to stay one step ahead in scheduling supplies and work on a day to day basis.

SUMMARY OF THE INVENTION

It is therefore a general object of the present invention to provide support for an easy to use project management system which can be readily incorporated into the operations of even the smallest corporations and firms while being useful to the largest corporations as well.

It is a more specific object of the invention to provide an automated bill of material application program which will automatically create an indented bill of material from a functional sketch of a new product design.

According to the invention, the automated bill of material program is implemented using a database, such as IBM's DB2 relational database. The bill of material is created from a query session in which the user responds to prompts by entering functional product structure. The query mechanism could be an expert system, but this is not a requirement. In the implementation disclosed, a simple dialog, such as with IBM's REXX language, is used.

The process begins by producing a functional sketch of the new product design. This sketch is in the form of a hierarchial tree structure, encouraging a top down approach rather than focusing on design details. As the query occurs, the tree structure is created on the computer screen for the user to view. Within the relational database, the structure data i kept in one table for all products. This table is accessed by item number. Once the product structure is established, the user can see the hierarchical tree, check it for correctness and modify it, if necessary. From the tree structure, which has been captured in the relational database, the indented bill of material is built.

BRIEF DESCRIPTION OF THE DRAWINGS

The foregoing and other objects, aspects and advantages of the invention will be better appreciated from the following detailed description of a preferred embodiment of the invention with reference to the drawings, in which:

FIG. 9 is a screen showing a page of the indented bill of materials created from the examples shown in FIGS. 7 and 8.

DETAILED DESCRIPTION OF A PREFERRED EMBODIMENT OF THE INVENTION

Figure 1:
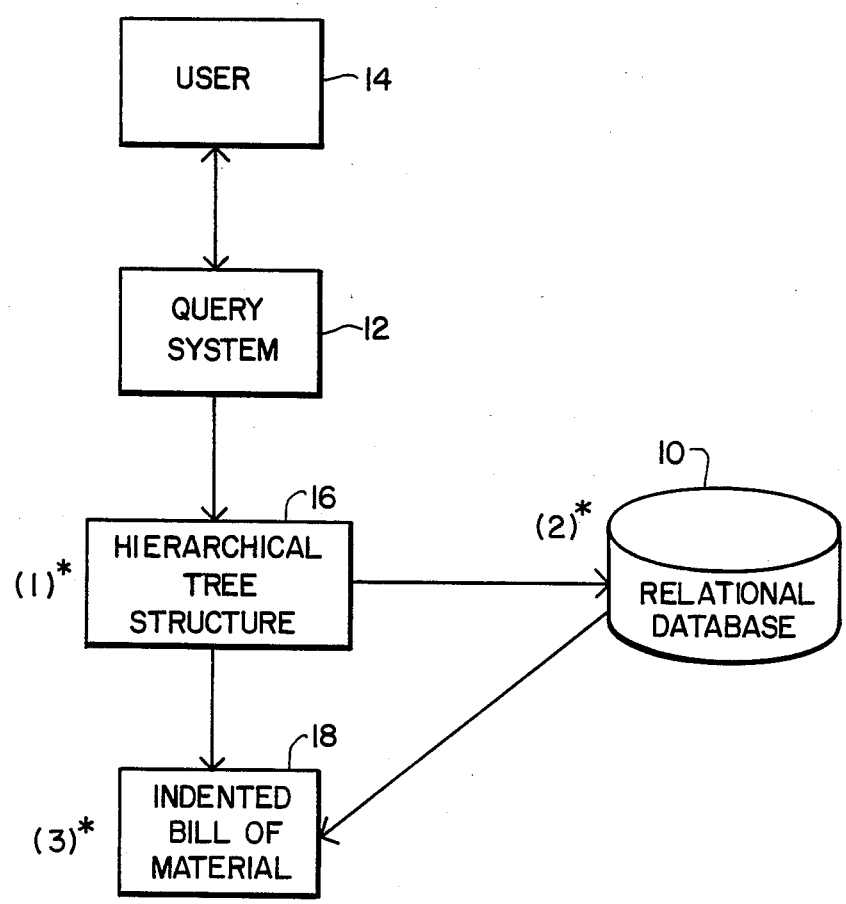
FIG. 1 is a system block diagram showing the functional requirements for implementing the automated bill of material according to the invention.

Referring now to the drawings, and more particularly to FIG. 1, there is shown in functional block diagram form the automated bill of material system according to the invention. The key parts of this system are the database 10 and the query system 12. The database 10 could be any of several products currently available, but for purposes of the preferred embodiment, IBM's DATABASE 2 (DB2) is used. DB2 is a relational data base management system, but it will be understood by those skilled in the art that other data bases, including hierarchical data bases, could be used. The query system 12 could be an expert system, but for purposes of the preferred embodiment, IBM's Restructured Extended Executor (REXX) language is used. General information on IBM's DB2 can be had with reference to publication No. GC26-4073-2 published by IBM Corp. A description of the REXX language is provided in *Virtual Machine/Systems Product, System Product Interpreter User's Guide,* Release 4, publication SC24-5238-2 published by IBM Corp.

The user 14 is first queried on the functional product structure by the query system 12, and in response to the user input, the database 10 captures the structure in a table. The query session begins by prompting the user to input the name of the product. The product might be a new lawnmower, for example, and the user would simply type in "LAWNMOWER". Then the query system asks the user to list the major components of the product. In the case of the lawnmower, this might be a frame assembly, an engine, a bagging assembly, and a handle and control assembly. These would be individually entered by the user in response to a prompt to enter the next component or indicate that there are no more major components by entering "END". Once the major components have been entered by the user, the user enters "END" causing the query session to then examine the subcomponents of the major components that have been entered. For example, the query system 12 would prompt the user 14 to enter the components of the frame assembly. These components might be engine deck and wheels. Again, when all the subcomponents for the frame assembly have been entered, the user enters "END", causing the query system to next prompt the user to enter the components of the engine. In this case, a complete engine assembly might be procured from an outside source so that there are no components to be listed by the user, so the user simply enters "END". The process continues until the user has entered all the components of the new product to a level of detail desired.

Figures 2, 3, 4:
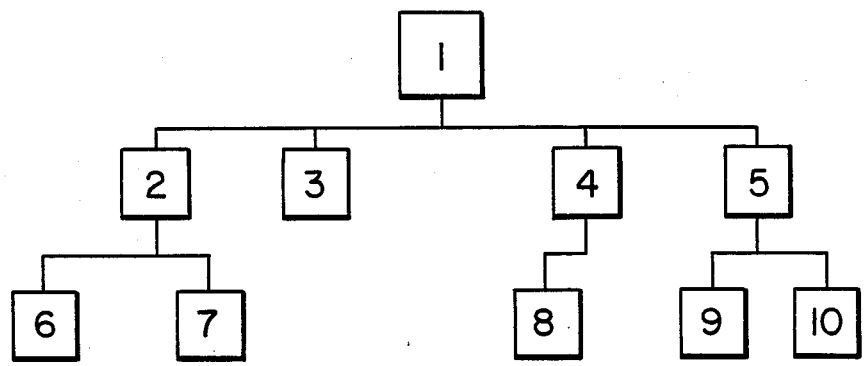
FIG. 2 is a pictorial representation of a hierarchical tree structure showing the functional representation of the components of a new product.
FIG. 3 is a table illustrating the organization of the database for the hierarchical tree structure shown in FIG. 2.
FIG. 4 is a generalized illustration of an indented bill of material produced by the invention from the relational database table shown in FIG. 3.

As the query session progresses, the components entered by the user 14 are captured in a table by the relational database 10 and a functional hierarchical tree of the structure 16 is generated on a computer screen. A generalized example of this tree structure is shown in FIG. 2 of the drawings. In this example, the tree structure has three levels. It may have as few as two levels and, within practical limits, an indefinite number of levels depending on the product and the level of detail required to define that product. In a specific embodiment of the invention, up to thirty levels of the tree structure are allowed. Experience indicates that this is sufficient for all but the most complex of products. For the example of a new lawnmower, block 1 in FIG. 2 would contain the legend "LAWNMOWER". This block would be generated immediately upon the entry of the word "LAWNMOWER" by the user 14. Then, as the user enters the names of the major components of the lawnmower, block 2 would be generated with the legend "FRAME ASSEMBLY", block 3 would be generated with the legend "ENGINE", block 4 would be generated with the legend "BAGGING ASSEMBLY", and block 5 would be generated with the legend "HANDLE AND CONTROL ASSEMBLY". As these blocks are generated, lines connecting them to block 1 are also generated. Then in the next level, block 6 with the legend "ENGINE DECK" is generated followed by block 7 with the legend "WHEELS", again with lines connecting these blocks to block 2. Since the engine is being purchased as a complete assembly and no subcomponents were entered by the user, there is no block under block 3. Blocks 8, 9 and 10 are then generated as the user enters subcomponent data in response to the query session.

The database 10 captures the component information from the user input in a table having the form shown in FIG. 3. Comparing this table to the hierarchical tree of FIG. 2, it will be observed that under the heading "ITEM" the numeral 1 is listed four times with the numerals 2, 3, 4, and 5 immediately to the right. This is followed by the numeral 2 listed twice with the numerals 6 and 7 immediately to the right. Thus, the table shown in FIG. 3 directly describes the hierarchical tree structure from which the graphical representation illustrated in FIG. 2 is generated for display on the computer screen. The user views this tree structure and can check it for correctness as it is generated and after the product structure is established by the end of the query session.

Referring back to FIG. 1, once the product structure is established, the next operation is to build an indented bill of material 18. For the product generally represented by the hierarchical tree structure shown in FIG. 2 and the relational database table shown in FIG. 3, the indented bill of material would have the general form shown in FIG. 4. This bill of material is built by accessing the database table for the product. The table is accessed by item number. In the top level, item 1 is not indented. The second level items 2, 3, 4, and 5 are indented one space. The third level items 6, 7, 8, 9, and 10 are each indented two spaces, and so on. The application code follows the item hierarchy as follows: Item 1 appears on the top line. Item 2 appears on the second line. Then the database is searched for item 2 antecedents. Items 6 and 7 would be found. Item 6 would then appear on the third line. The database is then searched for item 6 antecedents. In this example, none would be found, and item 7 would then appear on the fourth line. Again, the database is searched for item 7 antecedents, but again none would be found, and item 3 would appear on the fifth line. The remaining items are similarly processed until a complete bill of material is produced.

Figure 5:
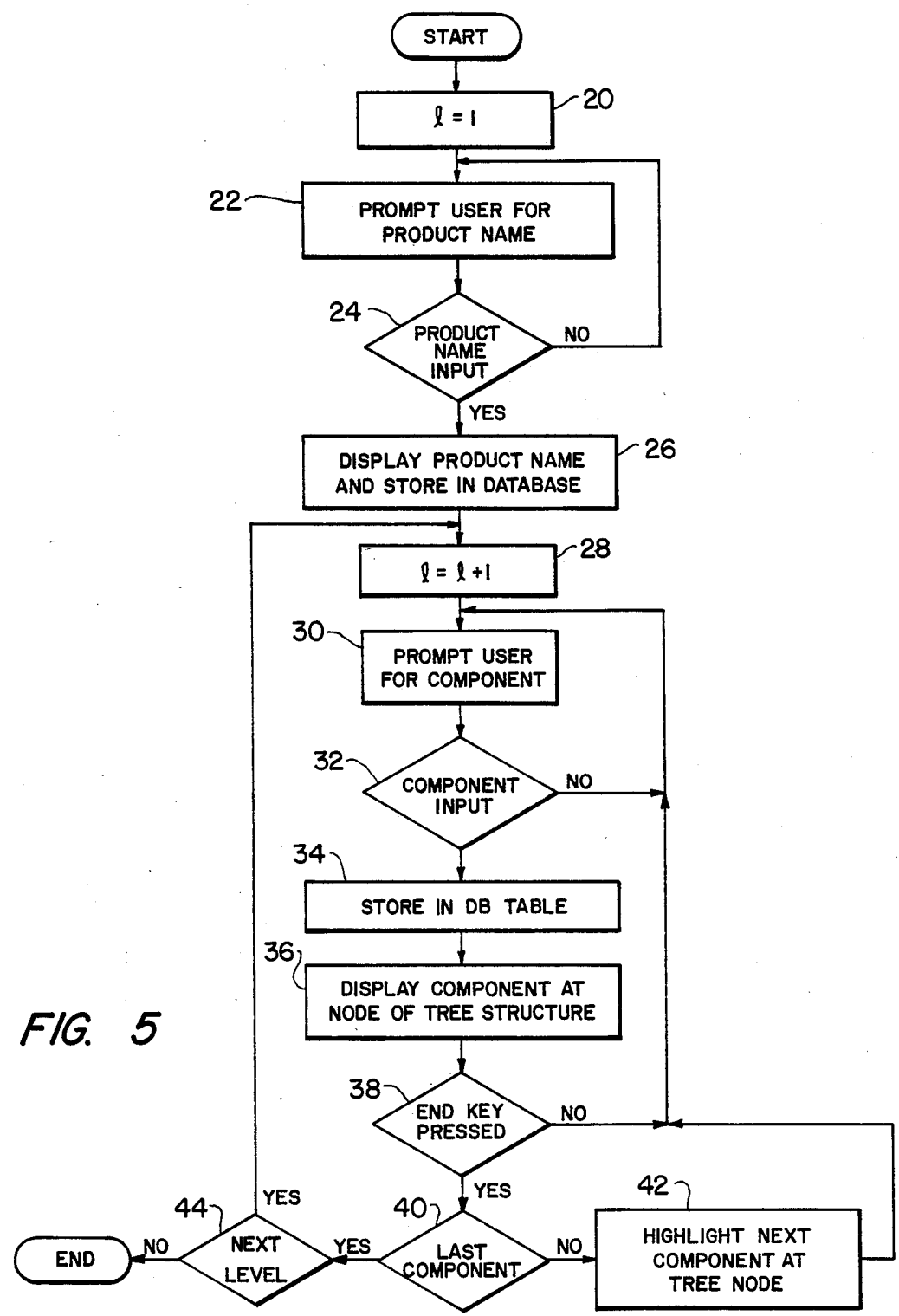
FIG. 5 is a flow chart showing the logic of the query session during which the table of FIG. 3 is built in the database.

FIG. 5 shows in flow chart form the logic of the query system according to the invention. This flow chart in combination with a dialog system, such as IBM's REXX language, and a database system, such as IBM's DB2, is sufficient for a programmer of ordinary skill in the art to write the required code to implement the query system. With specific reference to FIG. 5, the process begins by setting l=1 at block 20, where l is the product or component level. Then, at function block 22 the user of the system is prompted for the product name. In the example given, the name would be "LAWNMOWER". The system waits for a user input at decision block 24, and when the product name has been input, the system opens a file in the database with the product name and displays the product name on a computer screen in function block 26. In block 28, l is set to l+1 indicating the next level of components, and the system then prompts the user in function block 30 for the components of the product at this level. Each time the user inputs a component as detected by decision block 32, the inputted component is stored in the data base for that level in function block 34, and the system displays the inputted component on the computer screen at a node of the tree structure in function block 36. The system will continue to prompt the user for components after each component is entered by the user until the user presses an END function key which signals an end to the list of components for this level. Thus, the system tests the user input in decision block 38 for the END function key input. If that key input is not detected, then the system waits for the next user input in decision block 32, and when an input is received, the component is stored in the database table in function block 34 and so forth.

Once all the components have been input by the user for a given level as indicated by pressing the END function key, the system then determines in decision block 40 if the last component in the current level has had components input by the user. If not, the next component in the current level is highlighted in the displayed tree structure, and the system loops back to function block 30 where the user is again prompted for components of this component. On the other hand, if the last component of the current level has had components inputted by the user as detected in decision block 40, the system tests for a user input in decision block 44 to determine if components are to be entered for the next level. This is accomplished by the user pressing a Y key or an N key when prompted for the next level. If the Y key is pressed indicating that the user now wants to input the next level of components, the system loops back to block 28 to index to the next level. If on the other hand, the N key is pressed indicating that the user does not at this time wish to input the next level of components or that there is no next level of components to enter, the query process ends.

Figure 6:
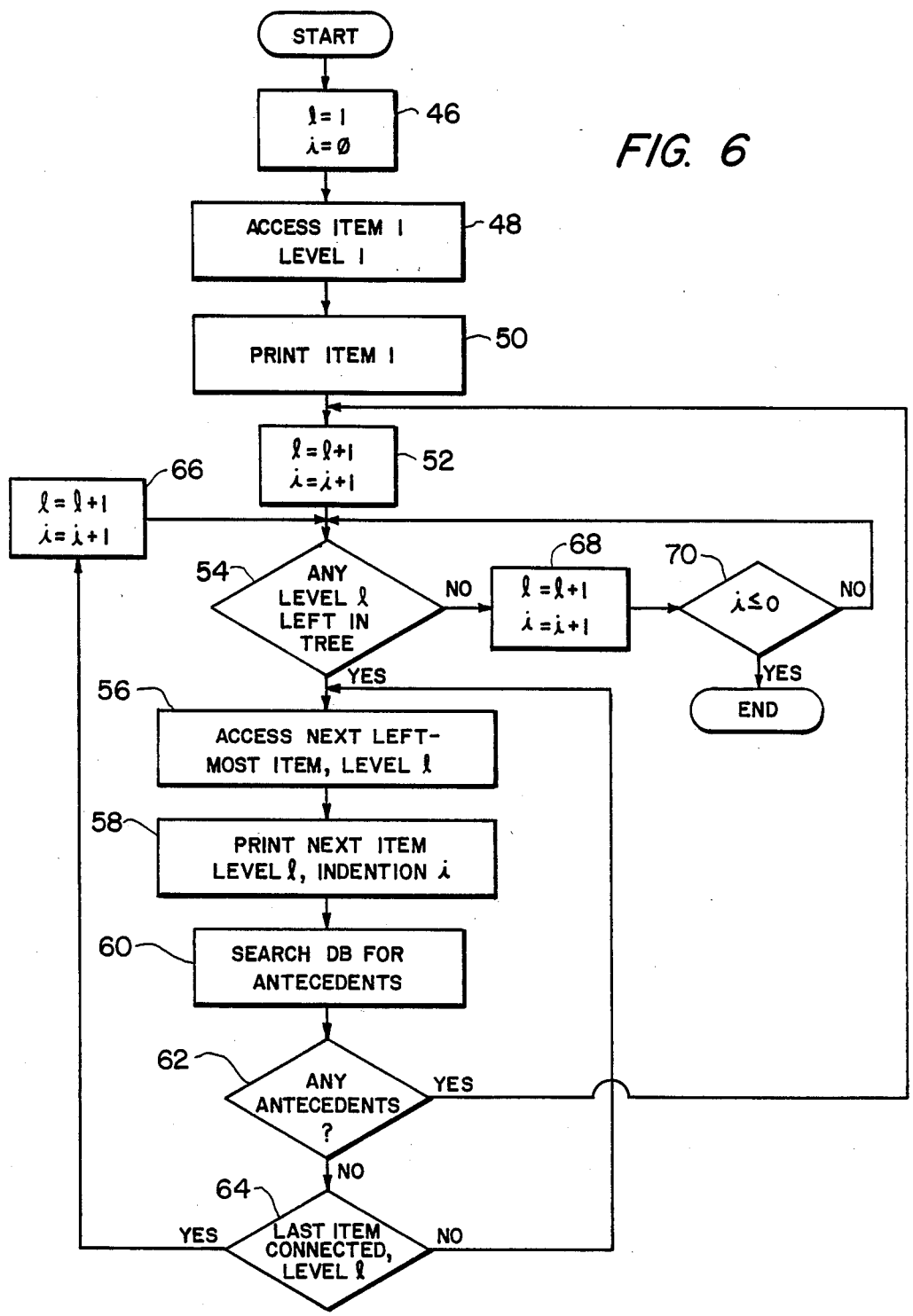
FIG. 6 is a flow chart showing the logic of the generation of the indented bill of materials shown in FIG. 4 using the table in the database.

Turning now to the flow chart of FIG. 6, the indented bill of materials is automatically generated from the table in the data base which was built during the query session. Again, this flow chart shows the logic of the automatic generation of the indented bill of materials, and any programmer skilled in the art with an understanding of data base systems, such as the IBM DB2 data base, can write code to implement the invention from the logic of the flow chart. The process begins in FIG. 6 by setting l=1 and i=0 in block 46, where l is the component level as before and i is the indentation of the bill of materials. Next, item 1 of level l is accessed in function block 48. In the example given, this item is the product name "LAWNMOWER". Item 1 is then printed in function block 50, and l and i are then indexed by adding 1 to each. A test is then made in decision block 54 to determine if any level l is left in the tree. If so, the system accesses the next left-most item in the tree of the current level in function block 56. The accessed item is then printed in function block 58 with indentation i. A search is then made of the data base in function block 60 for antecedents. If any are found in decision block 62, the system loops back to block 52 where the level and indentation are indexed by 1. Otherwise, a test is made in decision block 64 to determine if the last item of the current level has been connected. If so, the level and the indentation are indexed backward in block 66 by subtracting one from each. The process then returns to decision block 54 to continue the process of accessing and printing items in order. When the test in decision block 54 becomes negative, that is there are no levels l left in the tree structure, the level and indentation are again indexed backward by subtracting 1 in block 68. A test is then made in decision block 70 to determine if the indentation i is less than or equal to zero. If not, the process loops back to decision block 54; otherwise, the indented bill of materials is complete and the process ends.

Figure 7:
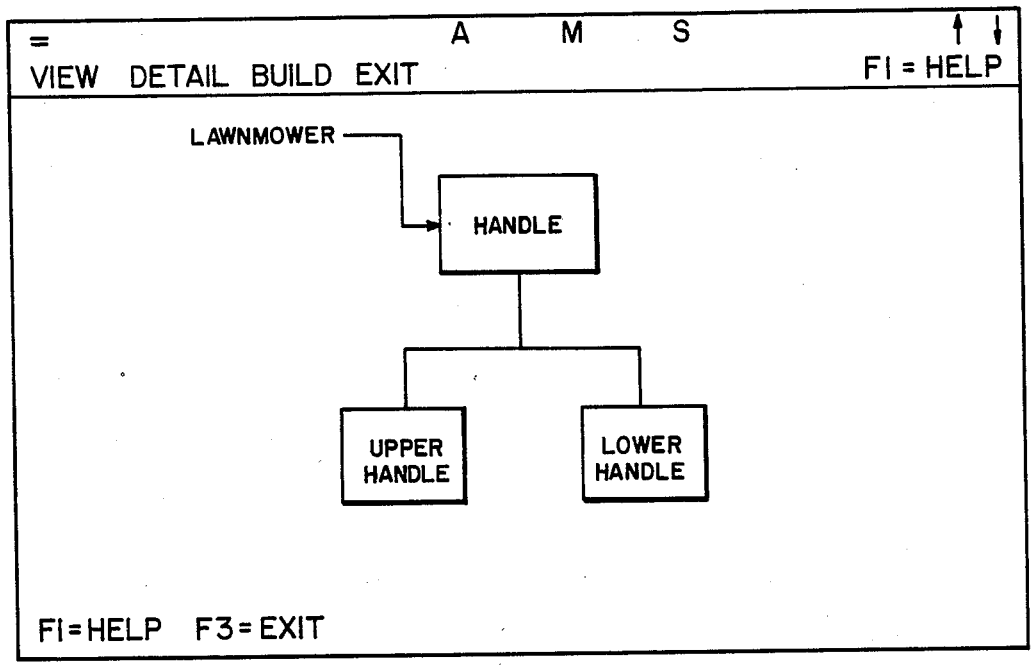
FIG. 7 is a screen showing a specific example of two levels of detail in a tree structure for a lawnmower handle using the subject invention
Figure 8:
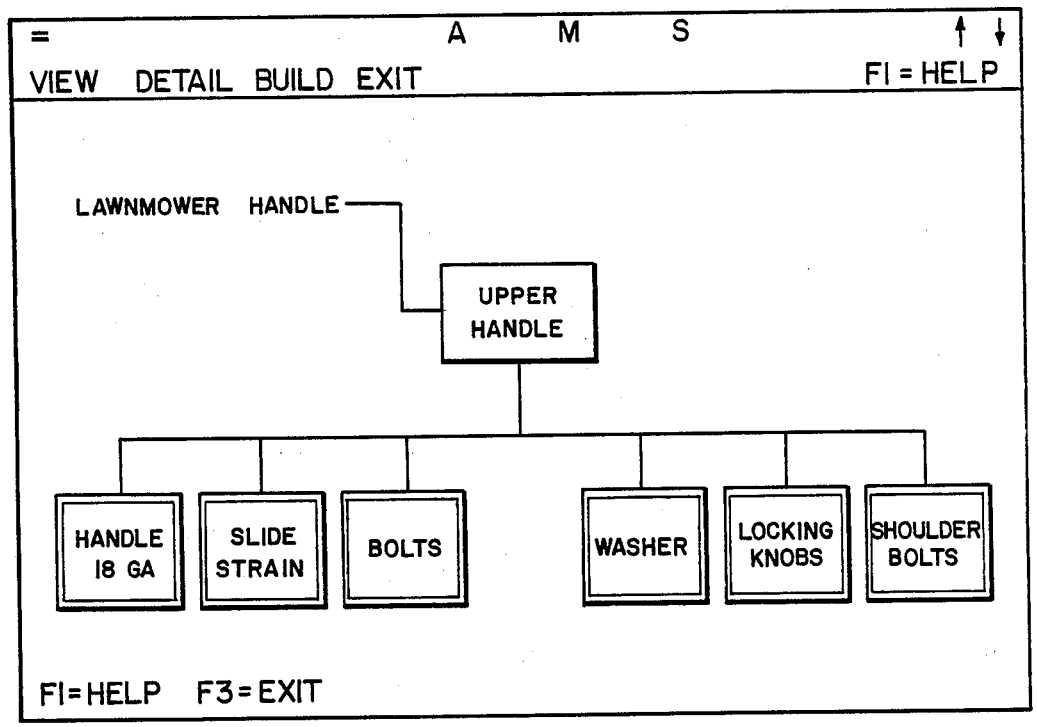
FIG. 8 is a screen showing the example of FIG. 7 expanded to three levels of detail in the tree structure.

Having described the logic of the system, the user interface of a specific example will be illustrated by way of screen dumps. The first of these is shown in FIG. 7 which shows the product "LAWNMOWER" and a first major component "HANDLE" with tow of its subcomponents "UPPER HANDLE" and "LOWER HANDLE" displayed in a simple tree structure. This tree represents three levels in terms of the logic illustrated by the flow charts of FIGS. 5 and 6. In FIG. 8, the user has input the components of a fourth level for the subcomponent "UPPER HANDLE". From these two illustrations, it will be apparent the manner in which each component level is built by user input to the system. Finally, in FIG. 9 the indented bill of materials for the handle assembly of the lawnmower is shown as it appears on the computer screen. Note that the bill of material may be scrolled up or down by the cursor keys as indicated in order to display the complete bill of material as generated from the data base.

From the foregoing, it will be appreciated that even the most unsophisticated computer users will be able to quickly produce a bill of material for a new product using the system according to the invention. The process will help to identify those components and subcomponents of the product which require more specification as to source or structure early in the design stage.

While the invention has been described in terms of a single preferred embodiment of the invention, those skilled in the are will appreciate that the invention can be practiced with modification and alteration within the spirit and scope of the appended claims. For example, while the preferred embodiment uses a relational data base, a hierarchical data base could also be used. And as previously mentioned the query system used in the preferred embodiment could be replaced by an expert system.

Having thus described our invention, what we claim as novel and desire to secure by Letters Patent is as follows:

1. A process for producing an automated bill of material for a product comprising:
    prompting a user to input components of a functional structure of the product;
    capturing product structure data input by the user in a database;
    generating a hierarchial tree structure of the product for display to the user as the product structure data is captured in the database, said tree structure having a plurality of levels defining components of the product in increasing detail; and
    generating an indented bill of material for the product from the product structure data captured in the database.

2. The process recited in claim 1 wherein the step of prompting is performed in each level of component detail until the user provides an indication that no further components for that level are to be input.

3. The process recited in claim 2 wherein the step of prompting is performed for each level of component detail until the user provides an indication that no further levels are to be input.

4. The process recited in claim 3 wherein the step of capturing product structure is performed by entering components for each level in a table in the database.

5. The process recited in claim 4 wherein said database is a relational database.

6. The process recited in claim 4 wherein the step of generating an indented bill of material is performed by the steps of:
    accessing item one of a first level in the table of the database and printing item one;
    indexing to a level and indentation by adding one to a current level and indentation;
    accessing a table for the next left-most item of the hierarchial tree structure and printing that item indented;
    searching the database for antecedents to the last item printed; and
    if antecedents are found, repeating the step of indexing the level and indentation by adding one to the current level and indentation and all subsequent steps, but if antecedents are not found, indexing the level and indentation by subtracting one from the current level and indentation before repeating the steps of accessing, printing and searching.

7. The process as recited in claim 6 further comprising the steps of:
    checking to determine if any levels are left in the hierarchical tree structure; and
    if so, continuing the process of accessing, printing and searching, otherwise, indexing the current level and indentation by subtracting one from each and checking to determine if the thus indexed indentation is less than or equal to one indicating an end of the process.

* * * * *